United States Patent
Gormley et al.

(10) Patent No.: US 9,923,700 B2
(45) Date of Patent: Mar. 20, 2018

(54) METHOD AND SYSTEM FOR LOCALIZING INTERFERENCE IN SPECTRUM CO-EXISTENCE NETWORK

(71) Applicant: EDEN ROCK COMMUNICATIONS, LLC, Bothell, WA (US)

(72) Inventors: Eamonn Gormley, Bothell, WA (US); Rekha Menon, Bothell, WA (US); Jungnam Yun, Bothell, WA (US)

(73) Assignee: SPECTRUM EFFECT, INC., Seattle, WA (US)

( * ) Notice: Subject to any disclaimer, the term of this patent is extended or adjusted under 35 U.S.C. 154(b) by 185 days.

(21) Appl. No.: 14/455,797

(22) Filed: Aug. 8, 2014

(65) Prior Publication Data

US 2015/0215949 A1    Jul. 30, 2015

Related U.S. Application Data

(60) Provisional application No. 61/931,856, filed on Jan. 27, 2014.

(51) Int. Cl.

| | |
|---|---|
| *H04L 5/00* | (2006.01) |
| *H04W 16/14* | (2009.01) |
| *H04W 24/02* | (2009.01) |
| *H04W 36/20* | (2009.01) |
| *H04W 52/24* | (2009.01) |

(52) U.S. Cl.
CPC ............. *H04L 5/006* (2013.01); *H04W 16/14* (2013.01); *H04W 24/02* (2013.01); *H04W 36/20* (2013.01); *H04W 52/243* (2013.01)

(58) Field of Classification Search
CPC . H04W 16/14; H04W 72/042; H04W 72/082; H04W 72/04; H04W 72/0453; H04W 24/02; H04W 24/10; H04W 72/085; H04W 52/241; H04W 28/06; H04L 5/0053

See application file for complete search history.

(56) References Cited

U.S. PATENT DOCUMENTS

| | | | | |
|---|---|---|---|---|
| 7,843,375 | B1 * | 11/2010 | Rennie | .............. G01S 7/021 342/16 |
| 2008/0240024 | A1 | 10/2008 | Rao et al. | |
| 2011/0026427 | A1 * | 2/2011 | Wang | ............... H04B 7/0452 370/252 |
| 2011/0075634 | A1 * | 3/2011 | Maruyama | ....... H04W 36/0055 370/331 |

(Continued)

FOREIGN PATENT DOCUMENTS

| | | |
|---|---|---|
| JP | 2009-065653 A | 3/2009 |
| KR | 10-2011-0052154 A | 5/2011 |

OTHER PUBLICATIONS

International Search Report and Written Opinion for PCT/US2014/050430, filed Aug. 8, 2014.

*Primary Examiner* — Oussama Roudani

(57) ABSTRACT

A method for sharing spectrum between a primary user and a secondary user includes receiving a signal transmitted by the primary user at a first network equipment of the secondary user, determining a first attenuation coefficient for the first network equipment, estimating interference from the first network equipment at a receiver of the primary user, and adjusting parameters of the first network equipment.

9 Claims, 5 Drawing Sheets

(56) References Cited

U.S. PATENT DOCUMENTS

| | | | |
|---|---|---|---|
| 2011/0287804 A1* | 11/2011 | Seo | H04W 52/146 |
| | | | 455/522 |
| 2012/0214525 A1* | 8/2012 | Fujii | H04B 1/005 |
| | | | 455/502 |
| 2012/0282932 A1* | 11/2012 | Yu | H04W 84/005 |
| | | | 455/437 |
| 2012/0294168 A1 | 11/2012 | Freda et al. | |
| 2014/0080535 A1* | 3/2014 | Gauvreau | H04W 16/14 |
| | | | 455/513 |
| 2014/0248919 A1* | 9/2014 | Li | H04W 52/38 |
| | | | 455/522 |
| 2014/0254494 A1* | 9/2014 | Clegg | H04W 72/082 |
| | | | 370/329 |

* cited by examiner

METHOD AND SYSTEM FOR LOCALIZING INTERFERENCE IN SPECTRUM CO-EXISTENCE NETWORK

CROSS-REFERENCES TO RELATED APPLICATIONS

The present invention claims priority to U.S. Provisional Application No. 61/931,856, filed Jan. 27, 2014, which is incorporated by reference herein for all purposes.

This invention was made with government support under contract number HR0011-13-C-0082, awarded by the Defense Advanced Research Projects Agency (DARPA). The government has certain rights in the invention.

BACKGROUND OF THE INVENTION

The growth of wireless data traffic is steady and it is anticipated that current frequency spectrum used for wireless operators will not be sufficient to meet the demand for wireless data traffic. Many countries, including the United States and members of the European Union, are working to repurpose underutilized blocks of spectrum so that the spectrum can be shared between incumbent users, also known as primary users, and secondary commercial users. However, if primary users and secondary users transmit and receive signals without coordination, interference between primary and secondary users which is separate from the co-channel interference within primary users systems and secondary users systems may be present.

BRIEF SUMMARY OF THE INVENTION

Embodiments of the present disclosure relate to methods and systems for coordinating the sharing of time, frequency and spatial domain of spectrum resources between primary users and secondary users.

In an embodiment, a method for sharing spectrum between a primary user and a secondary user includes receiving a signal transmitted by the primary user at a first network equipment of the secondary user, determining a first attenuation coefficient for the first network equipment, estimating interference from the first network equipment at a receiver of the primary user, and adjusting parameters of the first network equipment. The method may further include receiving the signal at a second network equipment of the secondary user and determining a second attenuation coefficient for the second network equipment.

In an embodiment, estimating interference includes estimating interference at the receiver of the primary source from the second network equipment. Determining the first attenuation value may include comparing a transmitted signal power of the first signal to a first received signal strength value of the first network equipment, and determining the second attenuation value may include comparing the transmitted signal power of the first signal to a second received signal strength value of the second network equipment.

Estimating interference may include multiplying the first attenuation coefficient by a transmission power of the first network equipment to determine a first interference value and multiplying the second attenuation coefficient by a transmission power of the second network equipment to determine a second interference value. Estimating interference may further include adding the first interference value and the second interference value to determine an aggregate interference value from the first and second network equipment at the receiver of the primary user. The method may further include comparing the aggregate interference value to a predetermined threshold value, and adjusting parameters may be performed when the estimated interference value exceeds the predetermined threshold value.

In an embodiment, adjusting parameters of the first network equipment includes reducing the transmission power of the first network equipment so that the estimated interference is below the predetermined threshold value. When the first attenuation coefficient is less than the second attenuation coefficient, adjusting parameters may further include reducing the transmission power of the first network equipment by a first amount and reducing the transmission power of the second network equipment by a second amount that is less than the first amount.

The network parameters may include a number of user equipment attached to the first network equipment, and adjusting parameters may include handing over user equipment attached to the first network equipment to different network equipment. In an embodiment in which the network parameters include a number of user equipment attached to the first network equipment and the first attenuation coefficient is less than the second attenuation coefficient, the method may include handing over user equipment attached to the first network equipment to the second network equipment to reduce the interference from the first network equipment at the receiver of the primary user.

In an embodiment, the method includes determining a direction of a source of interference to the primary user, and the direction of the source is used to identify the source of interference to the primary user as the first network equipment. The method may further include determining timing information for signals transmitted by second network equipment and comparing the timing information to signals received by the primary user to identify the second network equipment as a source of interference. The transmitted signal power may be received from the primary user, the primary user may be an incumbent user, and the signal may be a radar transmission.

Aspects of the present disclosure may be implemented in other forms, such as a system or as computer executable instructions on a computer readable medium.

DETAILED DESCRIPTION OF THE INVENTION

Figure 1:
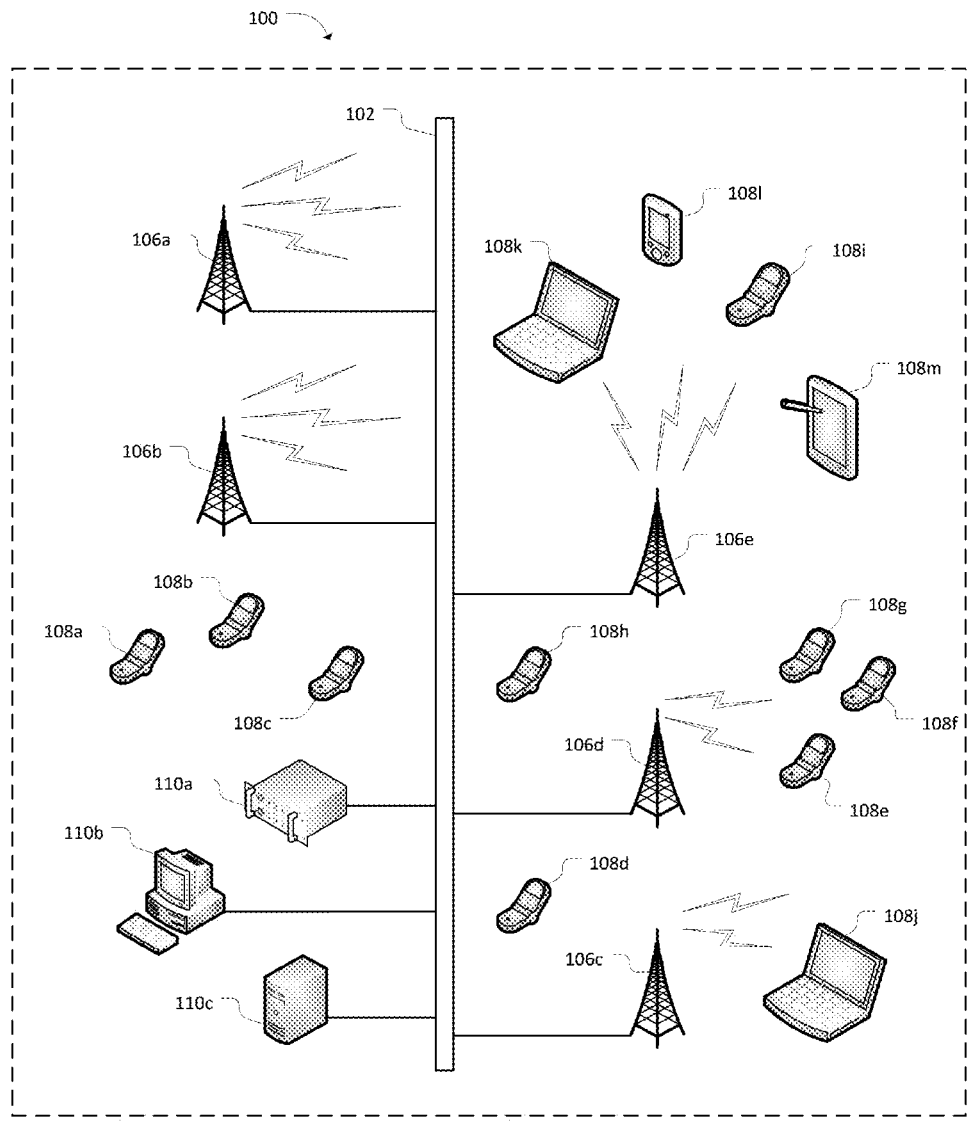
FIG. 1 illustrates a wireless communication system according to an embodiment.

In the following detailed description, reference is made to the accompanying drawings, which form a part of the description. The embodiments described in the detailed description, drawings, and claims are not meant to be limiting. Other embodiments may be utilized, and other changes may be made, without departing from the scope of the subject matter presented herein. It will be understood that the aspects of the present disclosure, as generally described herein and illustrated in the drawings, may be arranged, substituted, combined, separated, and designed in a wide variety of different configurations.

Embodiments can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Numerous specific details are set forth in the following description in order to provide a thorough understanding of the claims. These details are provided for the purpose of example and embodiments may be practiced according to the claims without some or all of these specific details. For the purpose of clarity, technical material that is known in the related technical fields has not been described in detail so that the disclosure is not unnecessarily obscured.

FIG. 1 illustrates a networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
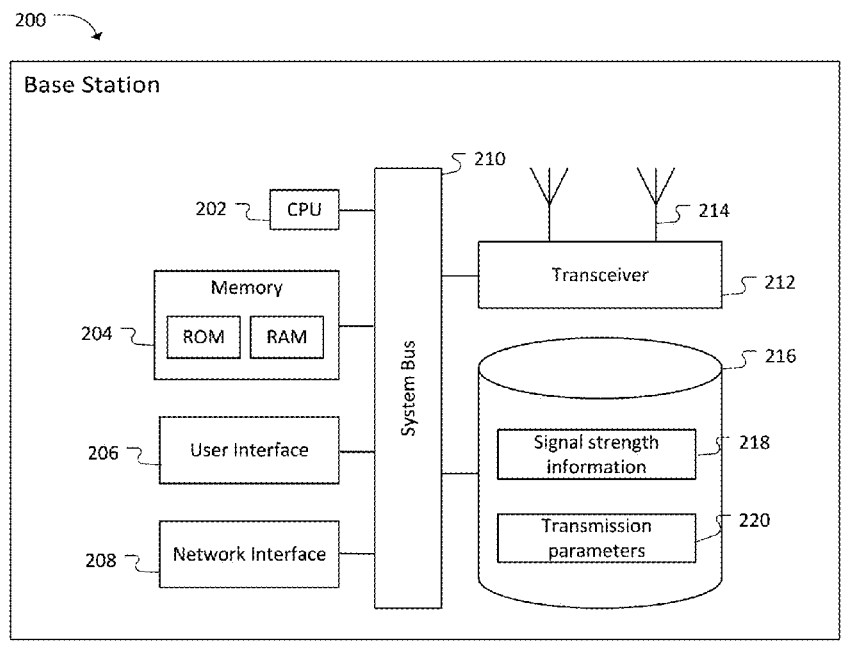
FIG. 2 illustrates a base station according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive data to and from other network elements through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store signal strength information 218 related to signals received by transceiver 214 and transmission parameters 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
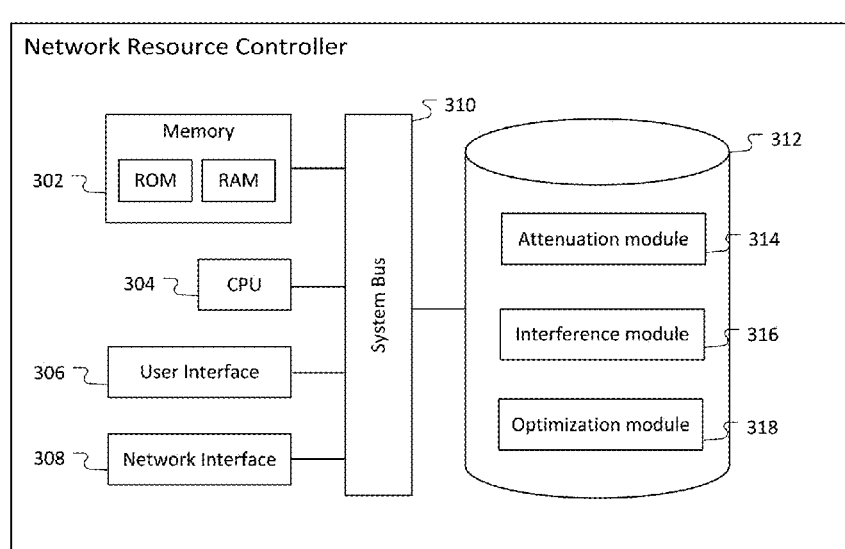
FIG. 3 illustrates a network resource controller according to an embodiment.

FIG. 3 illustrates a block diagram of an NRC 300 that may be representative of any of the network controller devices 110a-c. In an embodiment, one or more of the network controller devices 110a-c are SON controllers. The NRC 300 includes one or more processor devices including a CPU 304.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store, for example, an attenuation module 314, an interference module 316, and an optimization module 318.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
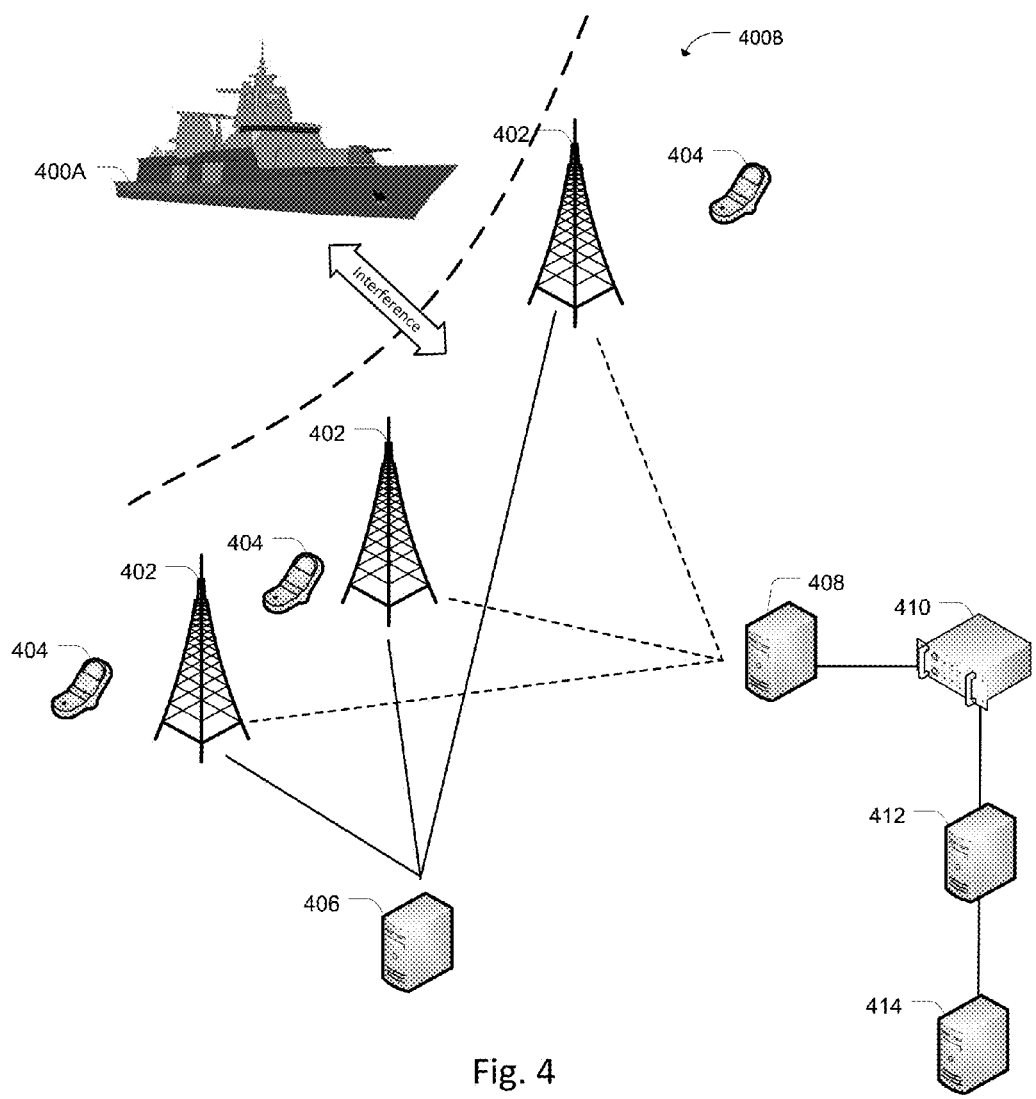
FIG. 4 illustrates an embodiment of a primary user and a secondary user.

FIG. 4 shows an embodiment of a spectrum co-existence environment. In FIG. 4, a primary user 400A is a ship borne radar system using a frequency spectrum. Although primary user 400A is shown as being a mobile vessel equipped with a radar, in other embodiments the primary user may have stationary equipment. The equipment may be communications equipment, research equipment, or any technology that transmits and/or receives radio frequencies.

In FIG. 4, secondary user 400B is a cellular communications network. The secondary user 400B is close in proximity to and uses time and frequency resources that coincide with the resources of primary user 400A. Absent coordination, the secondary user 400B and the primary user 400A would interfere with one another.

The cellular communications network 400B includes a plurality of base stations 402 communicating with a plurality of user equipment 404. The base stations 402 are coupled to a mobility management entity (MME) and system architecture evolution gateways (SAE-GWs) 406. An element management system (EMS) 408 manages the configurations and performance metrics of the base stations 402.

The EMS 408 may be coupled to a Self-Organizing Network (SON) server 410, which may be integrated with or physically separated from EMS 408. The EMS 408 and the SON server 410 are coupled to a spectrum access system (SAS) 412 and a spectrum policy database 414 from which the policy of spectrum usage of primary users 400A and secondary users 400B (and tertiary users and so forth) can be retrieved. The SAS 412 is responsible for coordinating accesses to time and frequency resources of the shared spectrum based on spectrum polices from the spectrum policy database 414.

In addition, SAS 412 may deliver the radio frequency (RF) transmission parameters and detection and measurement information between primary user 400A and secondary user 400B. RF transmission parameters available via the SAS 412 may include the transmission power, antenna gain, antenna pattern, antenna direction, operating frequency, etc. Other detection and measurement information may include interference power, location or other identity information of interference sources. System components which coordinate spectrum resource allocation may reside in the EMS 408 or in a separate SON server 410. Any of the MME/SAE-GW 406, EMS 408, SON server 410, SAS 412, and database 414 may correspond to an NRC 300 as illustrated in FIG. 3.

Although FIG. 4 illustrates a specific embodiment of a spectrum co-existence system, embodiments are not limited thereto. In other embodiments, processes of this disclosure may be implemented by one or more physical component of the system in a centralized or distributed fashion.

If secondary users are interfering with primary users, the secondary network may assist with identifying and localizing the interfering source to reduce interference to the primary users. In other words, primary and secondary users may cooperate in a spectrum co-existence environment. An embodiment of a system for spectrum co-existence 500 is illustrated in FIG. 5.

Figure 5:
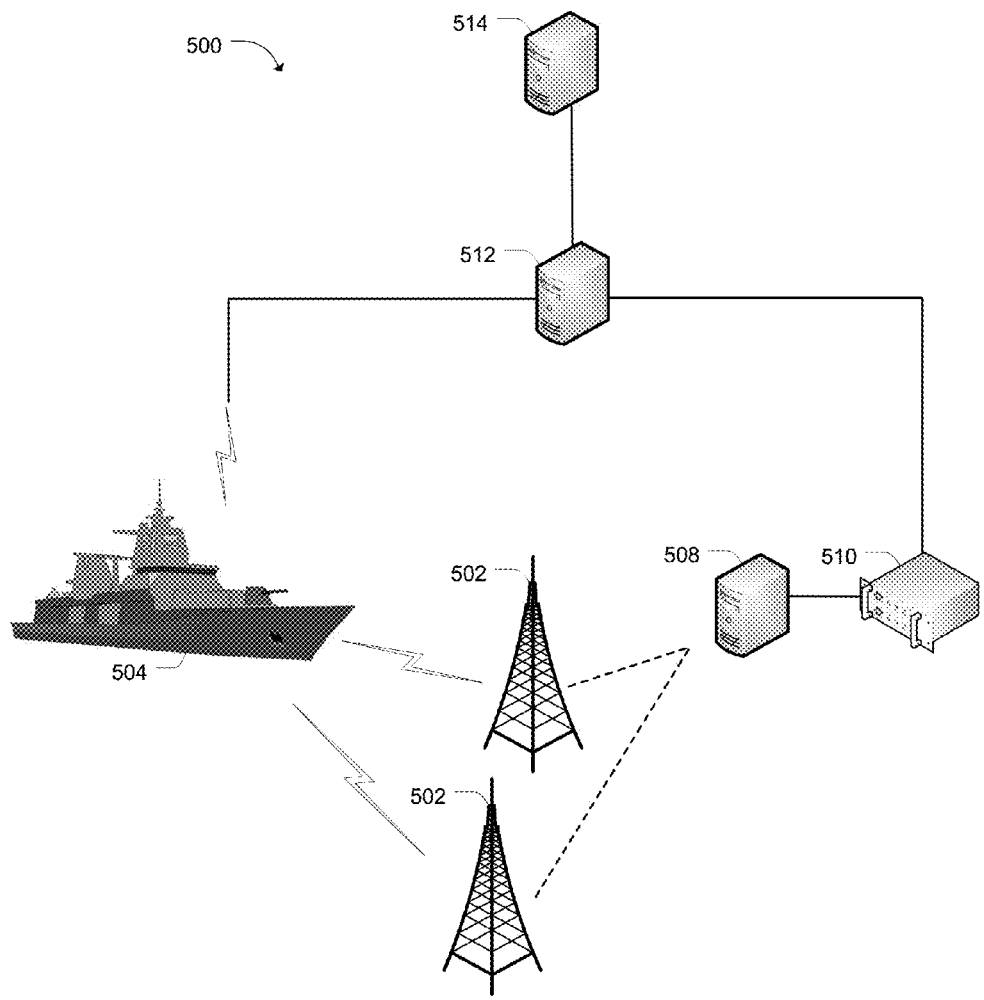
FIG. 5 illustrates an embodiment of a system for coordinated spectrum co-existence.

As seen in the embodiment of FIG. 5, a system 500 includes primary user network equipment 502 which interfere with secondary user 504. In the embodiment of FIG. 5, the network equipment 502 of the secondary user are cellular base stations. The base stations 502 are coupled to an EMS 508, which is coupled to SON server 510. The EMS 508 and SON server 510 are coupled to an SAS 512 and a spectrum policy database 514. SAS 512 is also in communication with primary user 504. The communication link between SAS 512 and primary user 504 may be a wireless link such as a cellular or satellite link. In embodiments in which the primary user is stationary, the link may be wired. In another embodiment, the network equipment 502 may be user equipment, or other equipment that includes an RF receiver.

Figure 6:
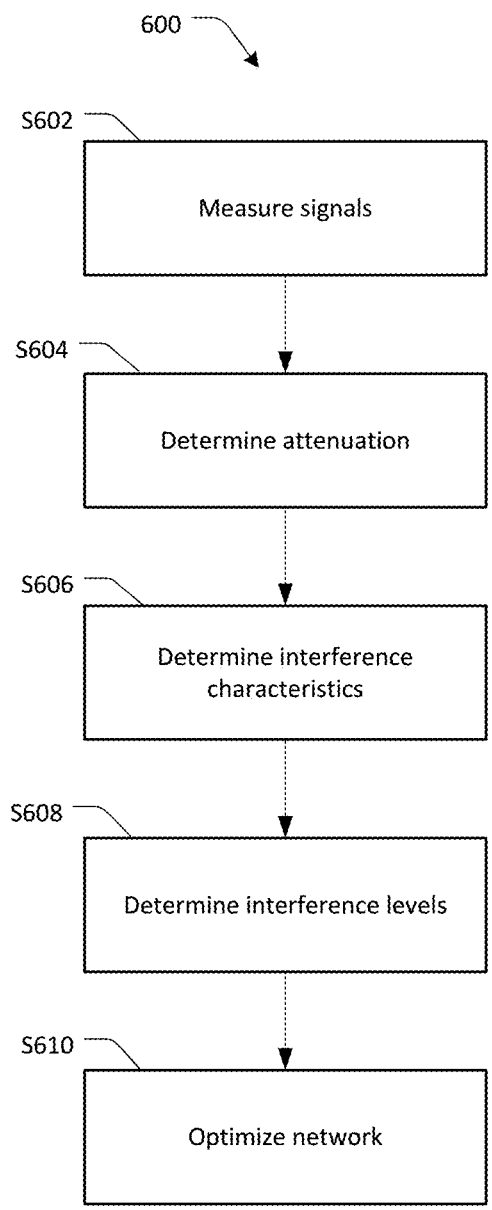
FIG. 6 illustrates an embodiment of a method for coordinated spectrum co-existence.

FIG. 6 illustrates a process 600 for spectrum co-existence, which will be explained with respect to the system 500 illustrated in FIG. 5. At S602, signals are measured by a network entity. In an embodiment, signals from primary user 504 are measured by one or more network equipment 502 of a secondary user.

When measuring signals at S602, the measurements may be made while the network equipment 502 of the secondary user are also transmitting signals. In another embodiment, network equipment 502 measure signals from primary user 504 during scheduled quiet times in the secondary network. Embodiments of scheduling quiet times in a communications network are discussed, for example, in U.S. Pat. No. 8,229,368.

The signals that are measured at S602 may be routine signals in the course of operations of the primary and secondary spectrum users. In another embodiment, signals may be deliberately scheduled and transmitted at a particular time and frequency. A central component of a spectrum co-existence system such as SON server 510 may coordinate scheduling and measurement of the signal.

At S604, attenuation values for RF signals between a primary user and a secondary user are determined Determining attenuation values S604 may use the transmission power of the primary user 504. For example, if the primary user 504 uses radar, then the transmission power of the radar may be acquired. The transmission power may then be compared to the received signal strength of the signals measured at S602 to calculate an attenuation coefficient. In an embodiment with a plurality of network equipment 502, each piece of secondary user network equipment 502 that experiences interference from the primary user 504 may calculate a separate attenuation value using respective received signal strength values and the transmission power value.

In another embodiment, a signal with a predetermined power level may be transmitted from either the primary user 504 to network equipment 502 of the secondary user, or from network equipment of the secondary user to the primary user at S604 to determine attenuation at S604. Embodiments may assume that attenuation is symmetrical between the primary user and the secondary user based on a signal in one direction, or determine separate attenuation values for each direction.

A system 500 may determine characteristics of interference at S606 to help identify specific sources of interference of the secondary user. In an embodiment, the primary user 504 may determine that interference is being received from the secondary user in one or more particular 'look' direction at S606. The particular direction may be an angular direction from the primary user's receiver.

For example, if a primary user is a radar system, then the radar may receive interfering signals from various network equipment of the secondary user. Radar systems determine the direction of reflections from radar pulses, so they are typically equipped to determine the direction of a source of interference. Primary users that can determine the direction of a received signal may also be able to determine a direction S606.

When a direction is determined at S606, direction information may be used to determine sources of interference to the primary user 504. For example, if a radar system determines that interference is coming from a particular direction, a system may compare the direction to locations of network equipment 502 of the secondary user to identify specific sources of interference to the primary user.

The primary user 504 may determine contents of the interfering signal from the secondary user at S606. For example, in LTE systems, synchronization signals are coded based on a Physical Cell Identifier (PCI) codes. Thus, a system may analyze contents of a signal received from the secondary user to determine an identifier that can be used to determine the source of the interfering signal.

In an embodiment, the primary user has equipment that decodes an identifier in the signal. In another embodiment, the primary user transmits signal information to a resource of a co-existence system, such as a SON server 510, and the resource decodes the identifier. The identifier may be used to focus the search for an interference signal on those nodes in the secondary network which transmit signals with a matching characteristic.

In an embodiment, parameters such as time and frequency of interference received by the primary user may be determined at S606. Timing and frequency information may be used to identify particular sources of interference from the secondary user. For example, when interference is detected at specific frequencies and times, the coordination system may compare those times and frequencies to transmissions from the secondary user. The comparison may determine a source by itself, or may be used in conjunction with other information such as attenuation information and direction of the interferer to identify one or more candidate for an interference source.

Interference levels between the primary and secondary users may be determined at S608. In an embodiment, interference levels are determined by estimating aggregated interference from all interfering network equipment 502 of the secondary user at the primary user 504. For example, transmission power of the network equipment 502 of the secondary user that is within a geographical area around the primary user 504 may be multiplied by the attenuation coefficients for the network equipment that were determined at S604.

When the attenuation coefficients of S604 are determined from primary user 504 signals received by network equipment 502 of the secondary user, the system may assume that attenuation from the primary user to the secondary user is the same as attenuation from the secondary user to the primary user. In other words, attenuation values used to determine interference from the secondary user to the primary user may be derived from transmissions from the primary user to the secondary user.

An aggregate interference level for the primary user 502 may then be determined by summing interference levels calculated for each network equipment 504 of the secondary user. In an embodiment, the aggregate interference level may be refined by using RF planning tools to improve estimated values, or by using actual measurement data to adjust estimated interference. As a result of S608, a system 500 may have information on how each piece of network equipment 504 of the secondary user affects and is affected by interference with the primary user 502.

Parameters of the secondary user and the primary user are optimized at S610. In an embodiment, parameters of the secondary user are changed in order to reduce interference to the primary user. Interference at the primary user may be compared to a predetermined threshold value, and parameters of the secondary user may be adjusted to reduce the interference level at the primary user.

For example, when the secondary user is a cellular communications network, the power allocation to base stations 504 may be changed to reduce transmission power of base stations which interfere with the primary user. When aggregate interference is determined at S608, the system 500 may calculate theoretical interference levels by reducing the amount of power to one or more base station and multiplying the reduced power by the attenuation coefficient. Such an operation may be iteratively performed for one or more base station 502 that causes interference to the primary user 504 until the theoretical aggregate interference falls below the threshold value, at which point the reduced power parameters may be implemented by the base stations. As a result, base stations that are physically close to the primary user may have power substantially reduced, and base stations that are further from the primary user may have less power reduction.

In addition to power reduction, network optimization S610 may increase power to one or more base station 502 in the network that does not cause high levels of interference to the primary user 504 in order to compensate for reduced performance from the power reductions. In another embodiment, base stations may increase the usage of or power to portions of a spectrum which do not interfere with the primary user while reducing power and usage of portions of the spectrum which interfere with the primary user.

Another network optimization that may be performed at S610 is to reduce the amount of transmissions at base stations 502 which cause interference to the primary user 504. For example, user equipment that is attached to cells which cause higher interference with the primary user may be handed over to cells which cause lower interference to the primary user. Handovers may be coordinated with power reduction to minimize the impact to the performance of the cellular network while keeping interference at the primary user below a threshold value. Although several specific examples of network optimization S610 are described above, the scope of optimizations that may be implemented are not limited to these examples.

One or more aspect of process 600 may be performed at regular intervals to coordinate spectrum co-existence in real time. Thus, embodiments of the present disclosure can accommodate changing conditions, such as the location of a ship-based radar as it passes by cellular base stations on land.

In order to avoid high interference between different access systems that use the shared spectrum, accesses for time and frequency resources of the spectrum may be controlled by a spectrum access system. Hence, malfunctioning spectrum access users or some users that do not abide by the spectrum access policy may be localized and forced to stop radio transmission.

When there is a malfunctioning secondary user that interferes with primary users, a system may perform measurements between secondary users during quiet times to localize a malfunctioning secondary user. The quiet times can be scheduled during a time when primary users are scheduled to transmit, or during a time when primary users are scheduled not to transmit, in order to identify any types of malfunctioning secondary users that transmit signals continuously or intermittently.

If a quiet time is scheduled during the time when primary users transmit, the received signal may include signals from primary users and from a malfunctioning secondary user. The primary user signals may be filtered out for further assessment of secondary user signals.

Quiet time measurements can be further processed using cross-correlation with known signals to determine the existence of malfunctioning secondary users in the network. The geographical location of the malfunctioning secondary user may be found by triangulation/trilateration methods based on measurement reports and geographical information of neighboring secondary users.

In order to localize malfunctioning primary users (e.g., primary users that transmit signals when they are not permitted to transmit and interfere with secondary users), a system may perform quiet time measurements in the secondary system at times during which the primary users are not expected to transmit. The quiet time measurements may be further processed using cross-correlation with known signals to determine the existence of malfunctioning primary users in the network. If there are no known signals of primary users, shared RF information, such as transmit power and antenna parameters, will be used to identify malfunctioning primary user. The geographical location of the malfunctioning primary user can be found by triangulation/trilateration methods based on measurement reports and geographical information of secondary users.

What is claimed is:

1. A method for sharing spectrum between a primary user and a secondary user, the method comprising:
   receiving a signal transmitted by the primary user at a first network equipment of the secondary user;
   determining a first attenuation coefficient for the first network equipment;
   estimating interference from the first network equipment at a receiver of the primary user wherein estimating interference comprises estimating interference at the receiver of the primary source from the second network equipment, multiplying the first attenuation coefficient by a transmission power of the first network equipment to determine a first interference value, multiplying the second attenuation coefficient by a transmission power of the second network equipment to determine a second interference value, and adding the first interference value and the second interference value to determine an aggregate interference value from the first and second network equipment at the receiver of the primary user;
   receiving the signal at a second network equipment of the secondary user;
   determining a second attenuation coefficient for the second network equipment;
   determining a direction of a source of interference to the primary user by analyzing signals transmitted from the first network equipment and received by the receiver of the primary user;
   identifying the source of interference to the primary user as the first network equipment based on the direction of the source of interference;
   comparing the aggregate interference value to a predetermined threshold value; and adjusting parameters of the first network equipment when the estimated interference value exceeds the predetermined threshold value,
wherein determining the first attenuation value includes comparing a transmitted signal power of the first signal to a first received signal strength value of the first network equipment, and
wherein determining the second attenuation value includes comparing the transmitted signal power of the first signal to a second received signal strength value of the second network equipment,
wherein the network parameters include a number of user equipment attached to the first network equipment, and
wherein adjusting parameters includes handing over user equipment attached to the first network equipment to a different network equipment.

2. The method of claim 1, wherein adjusting parameters of the first network equipment includes reducing the transmission power of the first network equipment so that the estimated interference is below the predetermined threshold value.

3. The method of claim 1, wherein the first attenuation coefficient is less than the second attenuation coefficient, and wherein adjusting parameters further comprises:
reducing the transmission power of the first network equipment by a first amount; and
reducing the transmission power of the second network equipment by a second amount that is less than the first amount.

4. The method of claim 1, wherein the first attenuation coefficient is less than the second attenuation coefficient, the method further comprising:
handing over user equipment attached to the first network equipment to the second network equipment to reduce the interference from the first network equipment at the receiver of the primary user.

5. The method of claim 1, further comprising:
determining timing information for signals transmitted by a second network equipment; and
comparing the timing information to signals received by the primary user to identify the second network equipment as a source of interference.

6. The method of claim 1, wherein the transmitted signal power is received from the primary user.

7. The method of claim 1, wherein the primary user is an incumbent user and the signal is a radar transmission.

8. A method for sharing spectrum between a primary user and a secondary user, the method comprising:
receiving a signal transmitted by the primary user at a first network equipment of the secondary user;
determining a first attenuation coefficient for the first network equipment;
estimating interference from the first network equipment at a receiver of the primary user wherein estimating interference comprises estimating interference at the receiver of the primary source from the second network equipment, multiplying the first attenuation coefficient by a transmission power of the first network equipment to determine a first interference value, multiplying the second attenuation coefficient by a transmission power of the second network equipment to determine a second interference value, and adding the first interference value and the second interference value to determine an aggregate interference value from the first and second network equipment at the receiver of the primary user;
receiving the signal at a second network equipment of the secondary user;
determining a second attenuation coefficient for the second network equipment;
determining a direction of a source of interference to the primary user by analyzing signals transmitted from the first network equipment and received by the receiver of the primary user;
identifying the source of interference to the primary user as the first network equipment based on the direction of the source of interference;
comparing the aggregate interference value to a predetermined threshold value; and
adjusting parameters of the first network equipment when the estimated interference value exceeds the predetermined threshold value,
wherein determining the first attenuation value includes comparing a transmitted signal power of the first signal to a first received signal strength value of the first network equipment, and
wherein determining the second attenuation value includes comparing the transmitted signal power of the first signal to a second received signal strength value of the second network equipment,
wherein the first attenuation coefficient is less than the second attenuation coefficient, and wherein adjusting parameters further comprises:
reducing the transmission power of the first network equipment by a first amount; and
reducing the transmission power of the second network equipment by a second amount that is less than the first amount.

9. A method for sharing spectrum between a primary user and a secondary user, the method comprising:
receiving a signal transmitted by the primary user at a first network equipment of the secondary user;
determining a first attenuation coefficient for the first network equipment;
estimating interference from the first network equipment at a receiver of the primary user wherein estimating interference comprises estimating interference at the receiver of the primary source from the second network equipment, multiplying the first attenuation coefficient by a transmission power of the first network equipment to determine a first interference value, multiplying the second attenuation coefficient by a transmission power of the second network equipment to determine a second interference value, and adding the first interference value and the second interference value to determine an aggregate interference value from the first and second network equipment at the receiver of the primary user;
receiving the signal at a second network equipment of the secondary user;
determining a second attenuation coefficient for the second network equipment;
determining a direction of a source of interference to the primary user by analyzing signals transmitted from the first network equipment and received by the receiver of the primary user;
identifying the source of interference to the primary user as the first network equipment based on the direction of the source of interference;
comparing the aggregate interference value to a predetermined threshold value;
adjusting parameters of the first network equipment when the estimated interference value exceeds the predetermined threshold value; and
handing over user equipment attached to the first network equipment to the second network equipment to reduce the interference from the first network equipment at the receiver of the primary user, wherein determining the first attenuation value includes comparing a transmitted signal power of the first signal to a first received signal strength value of the first network equipment, and wherein determining the second attenuation value includes comparing the transmitted signal power of the first signal to a second received signal strength value of the second network equipment, wherein the network parameters include a number of user equipment attached to the first network equipment and the first attenuation coefficient is less than the second attenuation coefficient.

* * * * *